(12) United States Patent
Manson et al.

(10) Patent No.: US 11,929,608 B2
(45) Date of Patent: Mar. 12, 2024

(54) SYSTEMS AND METHODS FOR OPERATING AN ISLANDED DISTRIBUTION SUBSTATION USING INVERTER POWER GENERATION

(71) Applicant: Schweitzer Engineering Laboratories, Inc., Pullman, WA (US)

(72) Inventors: Scott M. Manson, Moscow, ID (US); Jorge Fernando Calero, Coral Springs, FL (US); Angelos Kokkinis, Collinsville, IL (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 33 days.

(21) Appl. No.: 17/806,319

(22) Filed: Jun. 10, 2022

(65) Prior Publication Data
US 2023/0062817 A1    Mar. 2, 2023

Related U.S. Application Data

(60) Provisional application No. 63/239,691, filed on Sep. 1, 2021.

(51) Int. Cl.
*H02H 7/22* (2006.01)
*H02H 1/00* (2006.01)

(52) U.S. Cl.
CPC ............ *H02H 7/22* (2013.01); *H02H 1/0007* (2013.01)

(58) Field of Classification Search
CPC .......... H02H 7/22; H02H 7/28; H02H 1/0007; H02H 3/006; H02J 3/28; H02J 3/388; H02J 11/00
(Continued)

(56) References Cited

U.S. PATENT DOCUMENTS

| 3,849,637 A | 11/1974 | Caruso |
| 4,916,328 A | 4/1990 | Culp |

(Continued)

FOREIGN PATENT DOCUMENTS

| CN | 101545953 | 1/2011 |
| CN | 102841279 | 10/2014 |

(Continued)

OTHER PUBLICATIONS

S. A. R. Konakalla, A. Valibeygi and R. A. de Callafon, "Microgrid Dynamic Modeling and Islanding Control With Synchrophasor Data," in IEEE Transactions on Smart Grid, vol. 11, No. 1, pp. 905-915, Jan. 2020, doi: 10.1109/TSG.2019.2948815 (Year: 2020).*

(Continued)

*Primary Examiner* — Thienvu V Tran
*Assistant Examiner* — Sreeya Sreevatsa
(74) *Attorney, Agent, or Firm* — Fletcher Yoder, P.C.; Richard M. Edge

(57) ABSTRACT

Systems and methods are described herein to accommodate different settings associated with an inverter-based electric power generator and an inverter-based electric power generator for electric power generation within an electric power delivery system. The electric power delivery system may provide electric power generated by a bulk electric system to the loads via distributed substations using a first operating frequency. Moreover, the distributed substations may include inverter-based electric power generators to supply the electric power demand of downstream loads in an islanded configuration. That said, the inverter-based electric power generators may supply the electric power using a second frequency that is higher than the first frequency. Protective systems, positioned downstream from the distributed substations, may use different settings associated with the bulk electric system or the inverter-based electric power (Continued)

generators based on detecting the frequency of the supplied electric power.

18 Claims, 7 Drawing Sheets

(58) Field of Classification Search
USPC .......................................................... 361/79
See application file for complete search history.

(56) References Cited

U.S. PATENT DOCUMENTS

| | | | |
|---|---|---|---|
| 5,436,510 A | 7/1995 | Gilbert | |
| 5,734,586 A | 3/1998 | Chiang | |
| 6,204,642 B1 | 3/2001 | Lawson | |
| 6,492,801 B1 | 12/2002 | Sims | |
| 6,608,635 B1 | 8/2003 | Mumm | |
| 6,845,333 B2 | 1/2005 | Anderson | |
| 7,138,728 B2 | 11/2006 | LeRow | |
| 7,698,233 B1 | 4/2010 | Edwards | |
| 8,131,383 B2 | 3/2012 | Pearson | |
| 8,346,402 B2 | 1/2013 | Guzman-Casillas | |
| 8,373,309 B2 | 2/2013 | Qin | |
| 8,604,803 B2 | 12/2013 | Dooley | |
| 8,606,372 B1 | 12/2013 | Harris | |
| 8,965,592 B2 | 2/2015 | Manson | |
| 9,008,850 B2 | 4/2015 | Manson | |
| 9,478,378 B2 | 10/2016 | Kasztenny | |
| 9,519,301 B2 | 12/2016 | Bartlett | |
| 10,153,635 B2 | 12/2018 | O'Brien | |
| 10,333,301 B2 | 6/2019 | Gubba Ravikumar | |
| 10,833,507 B2 | 11/2020 | Manson | |
| 10,923,907 B2 | 2/2021 | Fan | |
| 11,239,659 B2 | 2/2022 | Thompson | |
| 11,316,349 B2 | 4/2022 | Thompson | |
| 2002/0091503 A1 | 7/2002 | Carrillo | |
| 2003/0042876 A1 | 3/2003 | Ikeda | |
| 2003/0080741 A1 | 5/2003 | LeRow | |
| 2004/0164717 A1 | 8/2004 | Thompson | |
| 2005/0285574 A1 | 12/2005 | Huff | |
| 2007/0008968 A1 | 1/2007 | Baker | |
| 2007/0162189 A1 | 7/2007 | Huff | |
| 2007/0168088 A1 | 7/2007 | Ewing | |
| 2007/0219755 A1 | 9/2007 | Williams | |
| 2007/0239372 A1 | 10/2007 | Schweitzer | |
| 2007/0239373 A1 | 10/2007 | Nasle | |
| 2008/0074810 A1 | 3/2008 | Guzman-Casillas | |
| 2008/0203820 A1* | 8/2008 | Kramer | H02J 3/40 307/64 |
| 2008/0278000 A1* | 11/2008 | Capp | H02J 3/38 307/21 |
| 2009/0085407 A1 | 4/2009 | Venkatasubramanian | |
| 2009/0216386 A1 | 8/2009 | Wedel | |
| 2010/0138066 A1 | 6/2010 | Kong | |
| 2010/0312414 A1 | 12/2010 | Kumar | |
| 2011/0004425 A1 | 1/2011 | Schweitzer | |
| 2011/0012422 A1 | 1/2011 | Neher | |
| 2011/0022245 A1 | 1/2011 | Goodrum | |
| 2011/0035065 A1 | 2/2011 | Schweitzer | |
| 2011/0054709 A1 | 3/2011 | Son | |
| 2011/0115301 A1 | 5/2011 | Bhavaraju | |
| 2011/0276192 A1 | 11/2011 | Ropp | |
| 2011/0320058 A1 | 12/2011 | Rietmann | |
| 2012/0123602 A1 | 5/2012 | Sun | |
| 2012/0215368 A1 | 8/2012 | Sharma | |
| 2012/0226386 A1 | 9/2012 | Kulathu | |
| 2012/0232710 A1 | 9/2012 | Warner | |
| 2012/0239216 A1 | 9/2012 | Kulathu | |
| 2012/0310434 A1 | 12/2012 | Taft | |
| 2012/0310559 A1 | 12/2012 | Taft | |
| 2013/0018521 A1 | 1/2013 | Manson | |
| 2013/0035800 A1 | 2/2013 | Kulathu | |
| 2013/0035885 A1 | 2/2013 | Sharon | |
| 2013/0073100 A1 | 3/2013 | Seeley | |
| 2013/0074513 A1 | 3/2013 | Mueller | |
| 2013/0114302 A1 | 5/2013 | Escobar | |
| 2013/0116843 A1 | 5/2013 | Kim | |
| 2013/0166085 A1 | 6/2013 | Cherian | |
| 2013/0265680 A1 | 10/2013 | Smit | |
| 2013/0289787 A1 | 10/2013 | Rouse | |
| 2014/0001847 A1 | 1/2014 | Khandelwal | |
| 2014/0148960 A1 | 5/2014 | Bhageria | |
| 2014/0156095 A1 | 6/2014 | Rouse | |
| 2014/0191591 A1 | 7/2014 | Kasztenny | |
| 2014/0214222 A1 | 7/2014 | Rouse | |
| 2014/0293494 A1 | 10/2014 | Allen | |
| 2014/0351010 A1 | 11/2014 | Kong | |
| 2015/0032278 A1 | 1/2015 | Bhageria | |
| 2015/0081127 A1 | 3/2015 | Bhageria | |
| 2015/0094871 A1 | 4/2015 | Bhageria | |
| 2015/0222123 A1 | 8/2015 | Manson | |
| 2015/0241894 A1 | 8/2015 | Bartlett | |
| 2015/0244170 A1 | 8/2015 | Bartlett | |
| 2015/0244171 A1 | 8/2015 | Bartlett | |
| 2015/0295529 A1 | 10/2015 | Rose | |
| 2015/0295581 A1 | 10/2015 | Shi | |
| 2015/0318705 A1 | 11/2015 | Lucas | |
| 2015/0380940 A1 | 12/2015 | Bhowmik | |
| 2016/0190790 A1 | 6/2016 | Oudalov | |
| 2016/0204611 A1* | 7/2016 | Chambon | H02J 3/46 307/26 |
| 2016/0266559 A1 | 9/2016 | Shi | |
| 2017/0077703 A1 | 3/2017 | Ropp | |
| 2017/0160711 A1 | 6/2017 | Wong | |
| 2017/0179720 A1* | 6/2017 | Porter | H02J 3/16 |
| 2017/0214249 A1 | 7/2017 | Seeley | |
| 2017/0271872 A1 | 9/2017 | Ravikumar | |
| 2017/0271882 A1 | 9/2017 | Ravikumar | |
| 2017/0346290 A1 | 11/2017 | Manson | |
| 2018/0048158 A1* | 2/2018 | Somani | H02J 3/381 |
| 2018/0152022 A1 | 5/2018 | Manson | |
| 2018/0316188 A1 | 11/2018 | Ishchenko | |
| 2018/0375338 A1 | 12/2018 | Manson | |
| 2019/0052083 A1 | 2/2019 | Lucas | |
| 2019/0312455 A1 | 10/2019 | Medici | |
| 2019/0319481 A1 | 10/2019 | Jin | |
| 2020/0389032 A1 | 12/2020 | Thompson | |
| 2020/0389048 A1 | 12/2020 | Manson | |

FOREIGN PATENT DOCUMENTS

| | | |
|---|---|---|
| DE | 10200733 | 7/2003 |
| EP | 1381132 | 9/2010 |
| WO | 2013115908 | 8/2013 |
| WO | 2015032420 | 3/2015 |

OTHER PUBLICATIONS

Kai Sun, Da-Zhong Zheng and Qiang Lu "Splitting Strategies for Islanding Operation of Large-Scale Power Systems Using OBDD-based methods," in IEEE Transactions on Power Systems, vol. 18, No. 2, pp. 912-923, May 2003.

Mark Grant, "Foxboro SCADA Systems Load Shedding and Electrical Monitoring Control Systems Design in Industrial Process Plants", 2012, retrieved on May 5, 2016 from http://iom.invensys.com/EN/pdfLibrary/WhitePaper_LoadSheddingandElectricalMonitoring.pdf.

Shi et al., "Active Synchronization Control for Microgrid Reconnection after Islanding", Oct. 2014, 5th IEEE PES Innovative Smart Grid Technologies Europe (ISGT Europe). Oct. 2014.

* cited by examiner

US 11,929,608 B2

SYSTEMS AND METHODS FOR OPERATING AN ISLANDED DISTRIBUTION SUBSTATION USING INVERTER POWER GENERATION

RELATED APPLICATION

This application claims the benefit under 35 U.S.C. § 119(e) of U.S. Provisional Application No. 63/239,691 filed Sep. 1, 2021, which is hereby incorporated by reference herein in its entirety.

BACKGROUND FIELD

The present disclosure relates generally to electric power delivery systems and, more particularly, to monitoring and control systems that prevent overloading of electric power sources.

Electric power delivery systems (e.g., macrogrids, distribution systems, among other things) are used to transmit electric power from generators to loads. The electric power delivery system may include an inverter-based electric power generation. Moreover, the electric power delivery system may include distributed substations and protective systems to facilitate transmission of electric power from generators to loads. Some electrical equipment may be able to receive electric power from a bulk electric power system (BES) as well as local inverter-based electric power generators. Yet the electrical equipment may not run in exactly the same way regardless of whether the equipment is receiving power from the BES or from the inverter-based power generators.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION

Figure 1:
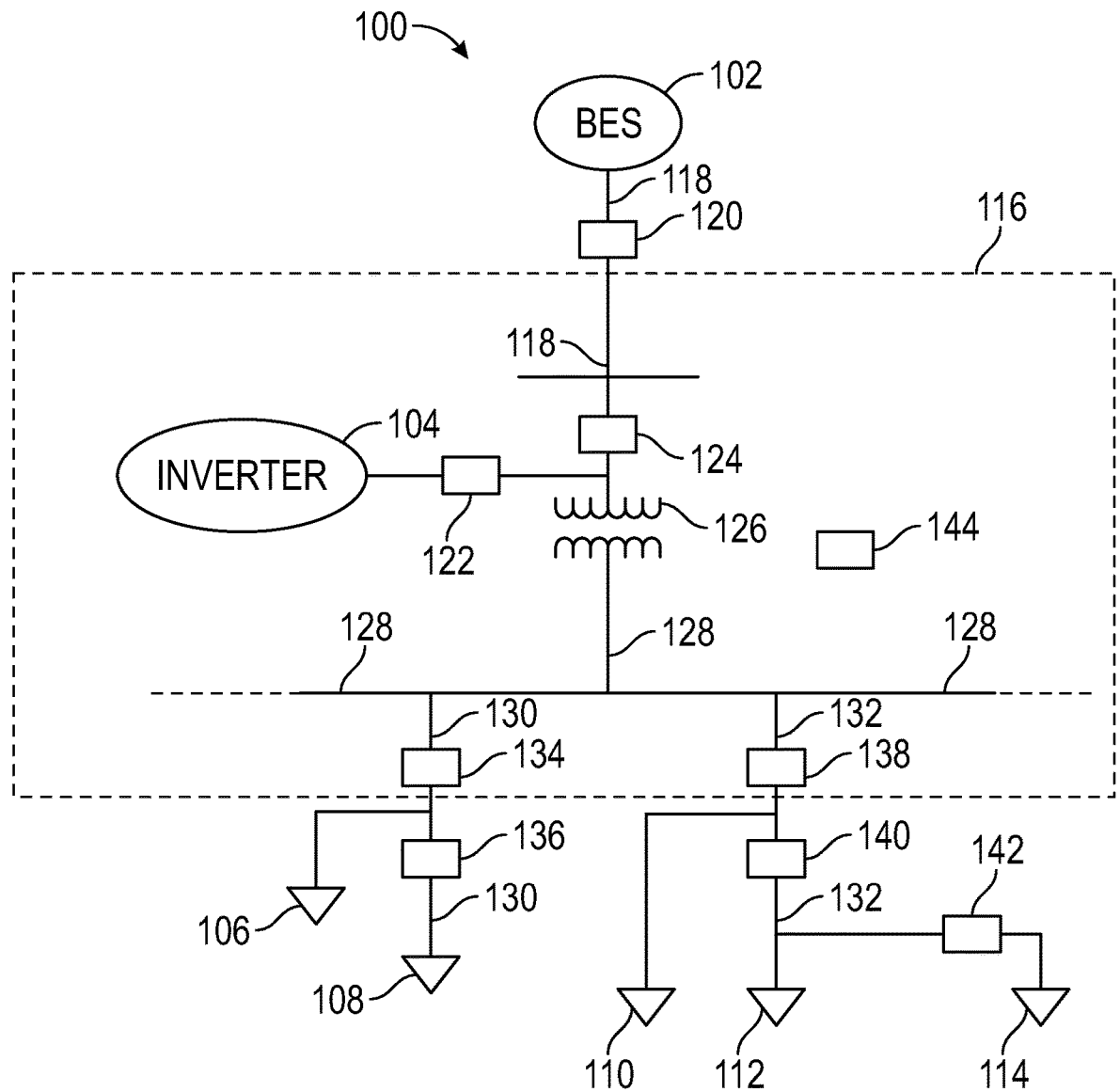
FIG. 1 depicts an electric power delivery system including a bulk electric system generation and inverter-based generation, in accordance with an embodiment.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Systems and methods are described herein to accommodate different settings associated with an inverter-based electric power generator for electric power generation within an electric power delivery system. An electric power delivery system may include a number of distributed components including an electric power source, a number of distributed substations, and a number of loads. The electric power delivery system may provide electric power generated by the electric power source to the loads via the distributed substations. Each distributed substation may be coupled to the electric power source on one side and may be coupled to one or multiple loads on the other side of the distributed substation.

In some embodiments, the electric power source may include a bulk electric power system (BES) for generating and providing electric power to the loads. Moreover, one or more of the distributed substations, hereinafter substations, may also include a local electric power source such as one or multiple inverter-based electric power supplies (hereinafter inverters). For example, the inverters may produce alternating current (AC) power from a direct current (DC) source (e.g., battery). In some cases, the inverters may operate as battery-powered electric power sources.

A substation may provide electric power generated by the BES, the inverter, or both, to the loads coupled thereto. The substation may provide the electric power to the loads based on an electric power demand of the loads, the electric power generation of the BES, the electric power generation of the inverter, or a combination of such variables, as will be appreciated. The substation may provide the electric power to the loads via one or more feeders (e.g., feeder or distribution lines).

The substation may include a transformer for providing the electric power generated by the BES to the loads. For example, the transformer may adjust the electric power generated by the BES based on a standard distribution voltage level. That said, different substations may provide different downstream distribution voltage levels to the respective loads connected thereto. In some embodiments, the substation may include a switch or a point of common coupling (PCC) breaker between the transformer and upstream transmission lines for connecting and disconnecting the transformer from the BES.

When the PCC breaker is opened, the PCC breaker may disconnect the BES from the transformer. For example, the PCC breaker may open when the BES is overloaded, the BES is malfunctioning, or the BES is otherwise providing a fault current indicative of a fault condition of the BES. In some embodiments, when the PCC breaker is opened, the substation may provide the electric power to downstream loads using the inverter (or the inverters), as a dispatchable source. For example, the substation and the respective loads may operate as an isolated island or a microgrid using the inverters.

When the PCC breaker is closed, the PCC breaker may connect the BES to the transformer to provide the electric power to the downstream loads. However, the BES may become overloaded, may malfunction, or may experience unstable behavior. Moreover, in some cases, when the PCC breaker is closed, the BES may provide zero, close to zero, or below a threshold electric power.

The substation may use the inverter (or inverters) to supplement the BES to supply the electric power demand (or a portion of the electric power demand) of the loads. For example, the substation or a controller of the electric power delivery system may open the PCC breaker to indicate that the substation and the respective elements are islanded. As such, the substations may provide the electric power supplied by the inverter or the BES to the loads, for example, by opening or closing the PCC breaker.

With that in mind, the BES and the inverter may have different electric power generation capabilities and/or characteristics. In some cases, a controller may determine when the electric power source (e.g., the inverter or the BES) is overloaded. For example, when the inverter is supplying the electric power, the controller may determine whether the inverter is overloaded based on detecting a drop in the operating frequency higher than an inverter frequency drop threshold. In alternative or additional embodiments, the controller may determine whether the BES is overloaded based on detecting a drop in the operating frequency higher than a BES frequency drop threshold.

In any case, the controller may use different settings and/or thresholds for determining when the electric power source is overloaded. In some embodiments, overloading the inverter may result in a drop in the frequency of the downstream electric current. However, in some embodiments, the BES may compensate for the droop in the frequency by shifting up the frequency curve using higher power. As such, the degree of overloading the electric power source and the frequency droop may be proportional. Accordingly, the BES and the inverter may become overloaded based on different frequency droop thresholds. For example, the BES and the inverter may use different operating frequencies and threshold frequencies.

In such embodiments, the BES and the inverter may provide the downstream electric current using different operating frequencies (e.g., 60 Hertz (Hz) and 61 Hz, 50 Hz and 51 Hz). In some cases, a protective relaying scheme, disposed on the feeders, may determine the downstream operating frequency to detect whether the electric power delivery system is supplied by the inverter (e.g., islanded substation) or supplied by the BES. As such, the relaying scheme may use different frequency settings for load shedding based on whether the downstream electric power is sourced from the BES or the inverter.

That said, the controller may use different thresholds for load shedding and/or switching an operational state of the relaying scheme based on the different frequency settings. In some embodiments, the relaying scheme may disconnect one or more loads from the substation (load shedding) based on a BES power consumption threshold when the electric power is sourced from the BES. In additional or alternative embodiments, the relaying scheme may shed one or more loads based on a frequency threshold. Moreover, the relaying scheme may shed one or more loads based on a different frequency threshold when the electric power is sourced from the inverter.

For example, some of the feeders of the electric power delivery system may include one or more fault current detectors disposed thereon. A fault current detector may include an intelligent electronic device (IED), a circuit breaker (or breaker), a relay, a capacitor bank, or a controller. For example, an IED may receive and/or transmit a signal and/or data in order to perform a functionality, such as to control a breaker in response to electrical measurements of the electric power delivery system.

For instance, the electric power delivery system may use various fault current detectors (e.g., IEDs) to control certain aspects of the electric power delivery system. As used herein, an IED may refer to any processing-based device that monitors, controls, automates, and/or protects monitored equipment within the electric power delivery system. Although the present disclosure primarily discusses the IEDs as relays and/or breakers, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs may include an automation controller, a bay controller, a meter, a recloser control, a communications processor, a computing platform, a programmable logic controller (PLC), a programmable automation controller, an input and output module, and the like. Moreover, the term fault current detector and/or IED may be used to describe an individual IED or a system including multiple IEDs.

With the foregoing in mind, a fault current detector may detect a fault current based on monitoring the operating frequency. For example, the fault current detector may determine a source of the electric power based on determining the operating frequency.

As mentioned above, in a non-limiting example, the BES may provide the downstream electric power using 60 Hz nominal frequency and the inverter may provide the downstream electric power using 61 Hz nominal frequency. Accordingly, the fault current detector may correspond a downstream electric power with 60 Hz frequency to the BES and a downstream electric power with 61 Hz frequency to the inverter, or islanded condition.

Moreover, based on determining the source of the electric power, the fault current detector may use the BES or the inverter frequency thresholds to determine whether the electric power source is overloaded. When satisfying a respective frequency threshold, the fault current detector may open one or more of the associated relays to shed one or more loads, as will be appreciated.

With the foregoing in mind, FIG. 1 depicts an electric power delivery system 100 (e.g., an electric power distribution system, a macrogrid). The electric power delivery system 100 may be an example of the electric power delivery system described above. The electric power delivery system 100 may include a BES 102 and an inverter 104 to supply electric power to loads 106, 108, 110, 112, and 114. Moreover, the BES 102 and the inverter 104 may provide a downstream electric current with different operating frequencies (or nominal frequencies), as will be appreciated.

The BES 102 may electrically couple the loads 106, 108, 110, 112, and 114 via a substation 116 (e.g., distributed substation). The BES 102 and the substation 116 may electrically couple via a transmission line 118. The transmission line 118 may include a fault current detector 120. A fault current detector, such as the fault current detector 120 may include a breaker (e.g., relay) and/or a controller. As described above, the fault current detector 120 may open or close the breaker based on detecting a fault current (e.g., using the controller). For example, the fault current detector 120 may open the breaker to prevent damage to the BES 102, the substation 116, the loads 106, 108, 110, 112, and/or 114, among other components.

In some embodiments, the substation 116 may include the inverter 104, a breaker 122, a PCC breaker 124, a transformer 126, an electrical bus 128, feeders 130 and 132, and fault current detectors 134 and 138. That said, in some cases, the substation 116 may communicatively couple the inverter 104, the PCC breaker 124, or other components positioned outside the substation 116. The substation 116 may provide electric power supplied by the BES 102, the inverter 104, or both to downstream components. The substation 116 may use the transformer 126 to adjust the electric power supplied by the BES 102 and provide the adjusted electric power to downstream components. For example, the transformer 126 may adjust the electric power generated by the BES 102 based on a standard distribution voltage level.

Moreover, in the depicted embodiment, the inverter 104 is coupled to a high side of the transformer 126. Accordingly, the substation 116 may provide electric power supplied by the inverter 104 to the downstream components via the transformer 126. For example, the substation 116 or a controller associated with the electric power delivery system may open the PCC breaker 124 and close the breaker 122 to allow the substation 116 to provide the electric power. In alternative or additional embodiments, the inverter 104 may be coupled to a low side of the transformer 126. In such embodiments, the substation 116 may provide electric power supplied by the inverter 104 to the downstream components by bypassing the transformer 126.

The PCC breaker 124 may electrically disconnect the substation 116 and the BES 102 when opened. In some embodiments, a controller 144 associated with the electric power delivery system 100 may open and close a relay of the PCC breaker 124. Although the controller 144 is depicted outside the PCC breaker 124, in alternative or additional embodiments, the PCC breaker 124 may include the controller 144 or a portion of the controller 144. In some cases, the PCC breaker 124 may open when the BES 102 is overloaded or otherwise susceptible to failure. In some cases, when the PCC breaker 124 is open, the substation 116 may use the inverter 104 to supply at least a portion of the electric power demand associated with the loads 106, 108, 110, 112, and 114. For example, when the inverter 104 is providing the downstream electric current, the controller of the PCC breaker 124 may open the relay of the PCC breaker 124 and instruct the inverter 104 to supply the electric power based on a nominal operating frequency, as will be appreciated. In such cases, the substation 116 and the downstream components of the electric power delivery system 100 may operate as an isolated island or microgrid.

With the foregoing in mind, in specific cases, when the PCC breaker 124 is closed, the substation 116 may also use the inverter 104 to supply at least a portion of the electric power demand. For example, the downstream electric current supplied by the BES 102 may be lower than an electric power threshold (e.g., a power flux threshold), may experience a frequency lower than a threshold, or may experience other fault conditions. In such embodiments, the fault current detector 120, other fault current detectors positioned downstream or upstream from the substation 116, or some other component of the electric power delivery system 100 may determine and communicate the fault conditions. Accordingly, the substation 116 may use the inverter 104 to supply all or a portion of the electric power demand associated with the loads 106, 108, 110, 112, and 114.

The controller 144 may include one or more processors, microprocessors, programmable logic, or any combination of various elements for controlling operations of the substation 116. In some embodiments, the controller 144 may open and close the PCC breaker 124 and/or the breaker 122. Accordingly, in such embodiments, the controller 144 may switch the electric power source between the BES 102 and the inverter 104 for providing the electric power to the loads 106, 108, 110, 112, and 114. In additional or alternative cases, one or more controllers positioned inside or outside the substation 116 may open and close the PCC breaker 124 and/or the breaker 122, and/or switch the electric power source between the BES 102 and the inverter 104.

In any case, the substation 116 may provide the downstream electric power via the electrical bus 128 to supply the electric power demand of the loads 106, 108, 110, 112, and 114. The electrical bus 128 may couple to the feeders 130 and 132 to distribute the electric power in a radial electric power delivery system. In the depicted embodiment, the substation 116 may provide the electric power to the loads 106 and 108 via the feeder 130. Moreover, the substation 116 may provide the electric power to the loads 110, 112, and 114 via the feeder 132.

The feeder 130 may include a fault current detector 134 and 136 and the feeder 132 may include a fault current detectors 138, 140, and 142. As mentioned above, the BES 102 and the inverter 104 may use different operating frequencies for providing the downstream electric power/current. As such, the fault current detectors 134, 136, 138, 140, and 142 may monitor the operating frequency to detect the source of the supplied electric power.

In some cases, the inverter 104 may include (or be associated with) a controller. Such controller may adjust the frequency of the power generation based on a frequency and power droop curve, described below with respect to FIG. 5. For example, the controller may be included with the controller 144, and IED, or any other viable device.

In any case, as mentioned above, a fault current detector, such as the fault current detectors 120, 134, 136, 138, 140, and 142 may include an IED, a breaker, a relay, a capacitor bank, and/or a controller. For example, the fault current detectors 120, 134, 136, 138, 140, and/or 142 may receive and/or transmit a signal and/or data in order to perform a functionality, such as to control the respective breaker in response to electrical measurements of the electric power delivery system.

Moreover, the fault current detectors 134 and 138 may determine switching between the electric power sources (e.g., the BES 102 and the inverter 104). For example, the fault current detectors 134, 136, 138, 140, and/or 142 may determine (e.g., detect) whether the electric power source is switched from the BES 102 to the inverter 104 when the operating frequency becomes higher than a first frequency threshold. Moreover, the fault current detectors 134, 136, 138, 140, and/or 142 may determine whether the electric power source is switched from the inverter 104 to the BES 102 when the electric current frequency of the downstream electric current becomes lower than a second frequency threshold. In different embodiments, the first threshold and the second threshold may be similar or different.

Furthermore, as mentioned above, the BES 102 and the inverter 104 may become overloaded based on different electric power demand thresholds. Moreover, a frequency drop of the downstream electric current may be commensurate to a degree to which the electric power source is overloaded. However, the BES 102 and the inverter 104 may be overloaded. Accordingly, based on determining the electric power source, the fault current detectors 134, 136, 140, 142, and 138 may use a different frequency setting for load shedding.

In some embodiments, the fault current detectors 134, 136, 140, 142, and 138 may include a breaker. Accordingly, when the BES 102 is providing the electric power, the fault current detector 134 may open a respective breaker to shed the loads 106 and 108 when detecting a frequency lower than a frequency threshold. In some cases, the fault current detector 136 may open a respective breaker to shed the loads 106 and 108 when detecting a frequency lower than a frequency threshold. Moreover, the fault current detector 138 may open a respective breaker when detecting a frequency lower than a frequency threshold to shed the loads 110, 112, and 114. Furthermore, the fault current detectors 140 or 142 may open respective breakers when detecting a frequency lower than a frequency threshold to shed the loads 112 and 114 or 114 respectively.

With the foregoing in mind, the fault current detectors 142 and 140 may be time-coordinated (e.g., synchronized) such that a breaker of the fault current detector 142 may open before the fault current detector 140. For example, the breaker of the fault current detector 142 may open based on a smaller frequency drop below a higher frequency threshold. That is, the fault current detector 140 may open based on a higher frequency drop (e.g., higher degree of overloading the inverter 104) to shed the downstream loads. Accordingly, the fault current detector 142 may shed the load 114 before the fault current detector 140 shedding the remaining load (e.g., the load 112).

Although specific arrangement of components is depicted in the electric power delivery system 100 of FIG. 1, in different embodiments, the electric power delivery system 100 may use different arrangement of components. For example, in different or alternative embodiments, the electric power delivery system 100 may include different number of loads, fault current detectors, breakers, and electric power sources, arranged using similar or a different schematic. In different embodiments, the fault current detectors 134, 136, 138, 140, and 142 may control the respective breakers for granular load shedding based on one or multiple frequency thresholds.

Moreover, it should be appreciated that in different embodiments, the fault current detectors may use different circuitry. For example, the fault current detectors 134, 136, 138, 140, and 142 may include distributed sensors, controllers, or other circuitry disposed on the feeders 130 and 132 respectively. With the foregoing in mind, FIGS. 2, 6, and 7 describe methods 150, 200, and 300 for operating a fault current detector in an electric power delivery system 100. For example, the methods 150, 200, and 300 may be associated with or used by the fault current detectors 134, 136, 138, 140, and 142 of the electric power delivery system 100 described above. It should be appreciated that the methods 150, 200, and 300 may be performed by any viable computing system including any kind of viable storage circuitry, processing circuitry, which may be included with, positioned in proximity of, or remotely from each of the fault current detectors of the electric power delivery system.

Figure 2:
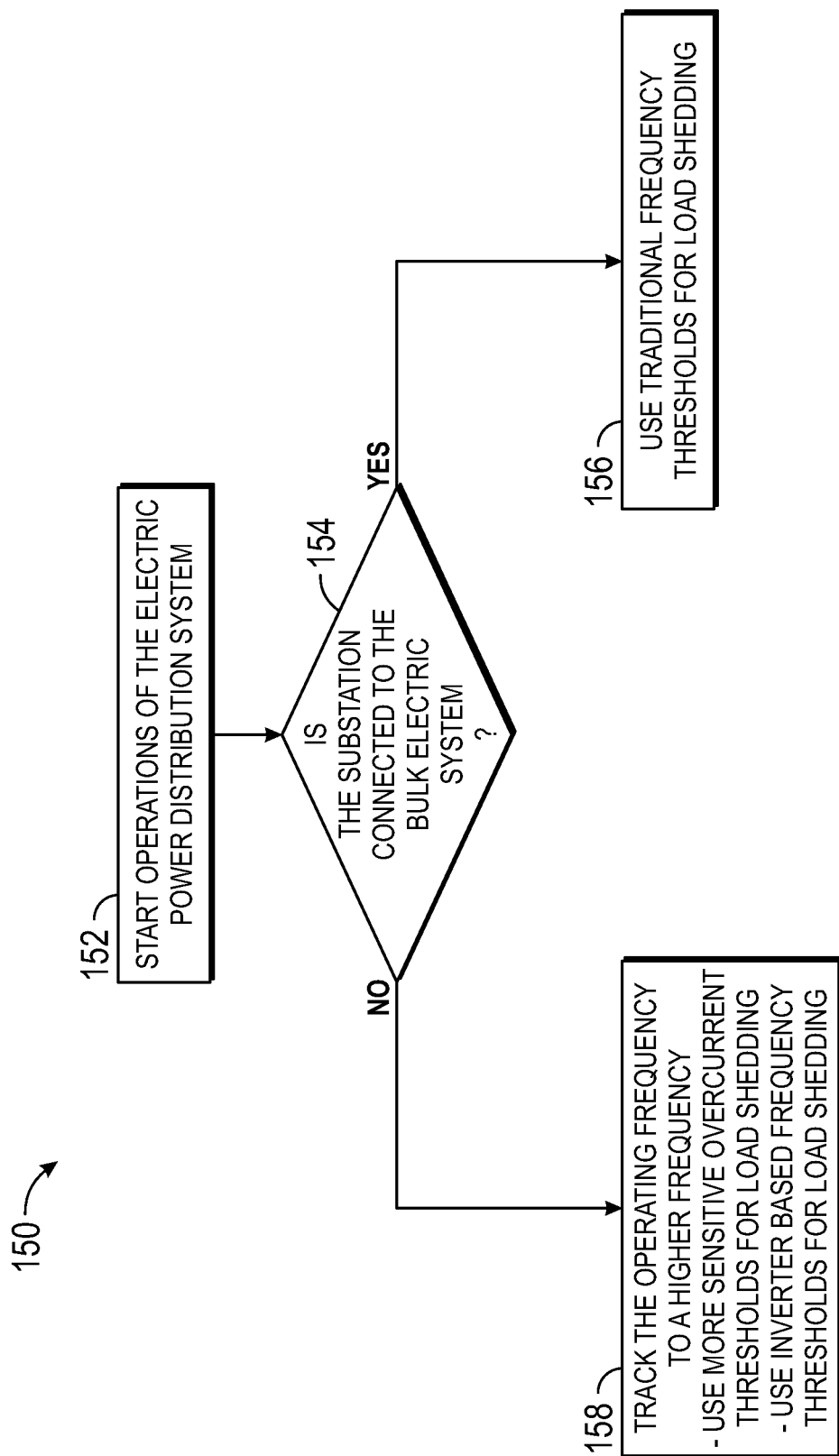
FIG. 2 depicts a method of operating the electric power delivery system, in accordance with an embodiment.

FIG. 2 depicts a method 150 associated with an example operation of the electric power delivery system 100. For example, the method 150 may be performed by a fault current detector (e.g., the fault current detectors 134, 136, 138, 140, and/or 142) for determining frequency thresholds for load shedding and/or sensitivity of overcurrent thresholds. Additionally and/or alternatively, the method 150 may be performed by a controller associated with the electric power delivery system 100, such as the controller 144 of the substation 116. The method 150 may cause load shedding based on whether the electric power is supplied by the BES 102 or the inverter 104 based on a connection state of the substation 116 to the BES 102. For example, the controller 144 (or any other viable controller positioned inside or outside the inverter 104) may control an open or closed state of the PCC breaker 124 and/or the breaker 122 to switch to providing the downstream electric power provided by the BES 102 or the inverter 104.

Referring now to block 152, the electric power delivery system 100 may operate to provide the electric power to the loads (e.g., the loads. 106, 108, 110, 112, and 114). At block 154, the fault current detector may determine whether the substation 116 connected to the BES 102. Based on a connection state of the substation 116 to the BES 102, the fault current detector may operate in a first mode or a second mode. In some embodiments, the fault current detector may determine whether the substation 116 is connected to the BES 102 based on detecting an operating frequency of the electric power, as will be appreciated.

Additionally or alternatively, at block 154, the controller 144 may determine whether the substation 116 connected to the BES 102. Based on block 154, the controller 144 may determine whether the fault current detectors 134, 136, 138, 140, and 142 may operate in a first mode or a second mode. In some embodiments, the controller 144 may determine whether the substation 116 is connected to the BES 102 based on a closed or open state of the PCC breaker 124 and/or the fault current detector 120. In additional or alternative embodiment, the controller 144 may determine that the substation 116 is not connected to the BES 102 based on detecting that the BES 102 is providing an unstable electric power, a lower than an electric power threshold, or both.

At block 156, when the substation 116 is connected to the BES 102, the fault current detector and/or the controller 144 may use the traditional frequency thresholds (or BES frequency thresholds) for load shedding, for example, in the first mode. An example of the BES frequency droop thresholds may be provided below with respect to FIG. 5. However, when the substation 116 is not connected to the BES 102, the fault current detector and/or the controller 144 may proceed to block 158.

At block 158, the opening of the PCC breaker shifts the operating frequency to a higher frequency (e.g., 61 or 51 Hz) than the BES operating frequency (e.g., 60 or 50 Hz). Moreover, at block 158, the fault current detector may use more sensitive overcurrent thresholds and inverter-based frequency thresholds for load shedding and/or for protecting the power system from faults in the second mode. The overcurrent thresholds may refer to a current range for providing the electric power to the downstream loads. For example, the fault current detectors may use higher sensitivity overcurrent thresholds. Moreover, the fault current detector may use the inverter frequency thresholds that are different from the traditional frequency thresholds for load shedding, as will be appreciated.

Figure 3:
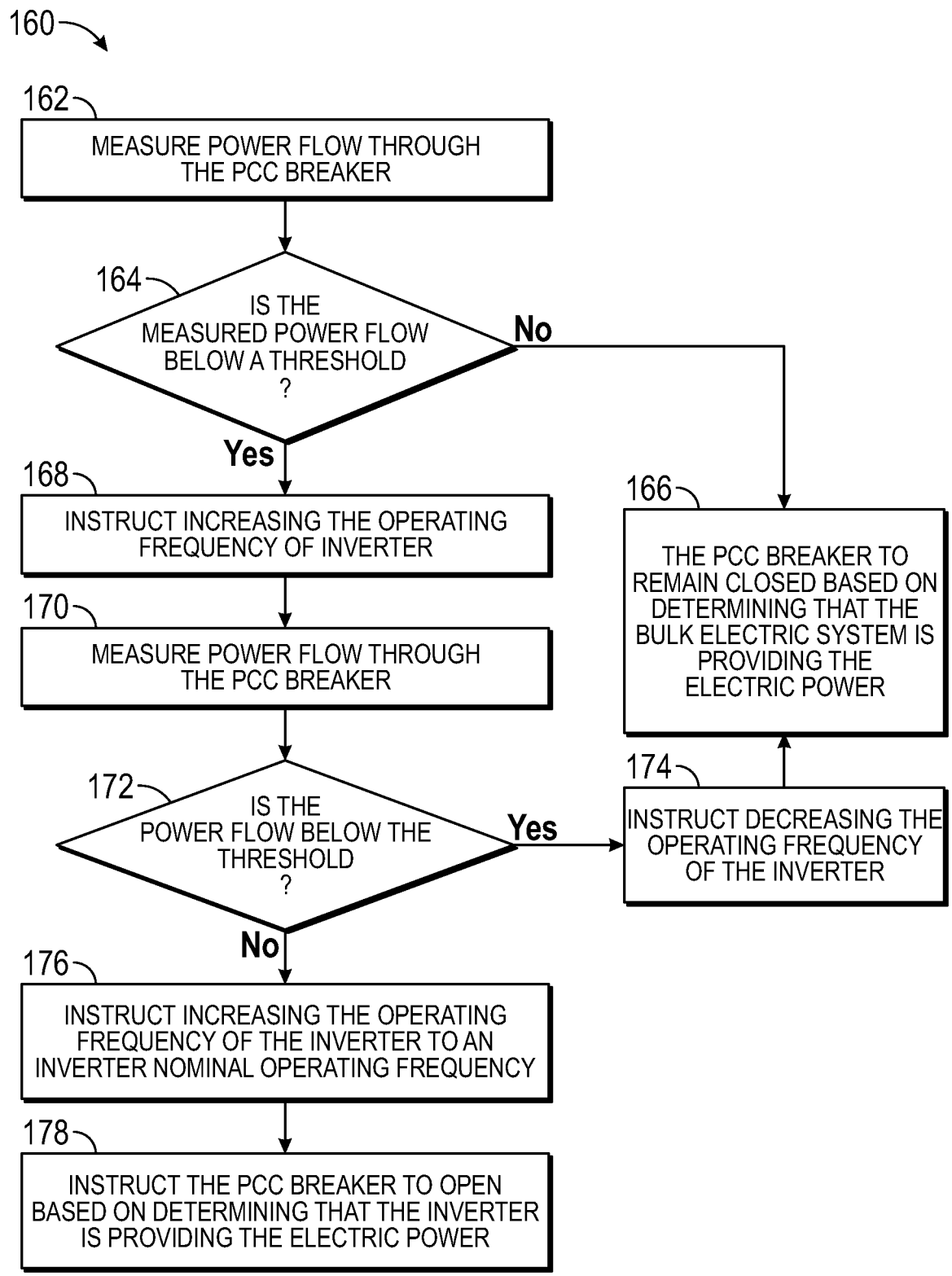
FIG. 3 depicts method of operating a point of common coupling breaker of FIG. 1 based on whether the bulk electric system or the inverter is providing the electric power to the loads, in accordance with an embodiment.

FIG. 3 depicts a method 160 of determining a source of the downstream electric current at the PCC breaker 124 depicted in FIG. 1. The PCC breaker 124 may remain closed or may open based on whether the BES 102 or the inverter 104 provide the downstream electric current. For example, the controller 144 may perform the process blocks of method 160 to determine whether the BES 102 or the inverter 104 is providing the downstream electric current. As mentioned above, the controller 144 may be a standalone component of the substation 116 or may be associated with or included within the PCC breaker 124.

Figure 4:
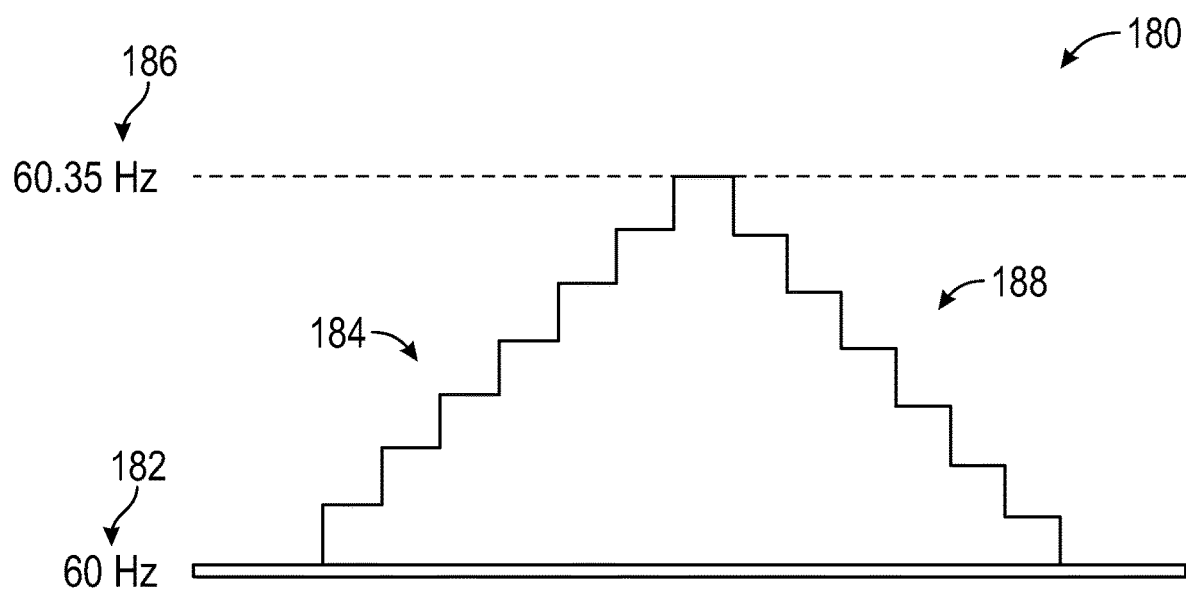
FIG. 4 depicts a graph of example operating frequencies of the inverter when the bulk electric system is primarily providing the electric power to a substation of the electric power delivery system in relation to method of FIG. 3, in accordance with an embodiment.
Figure 5:
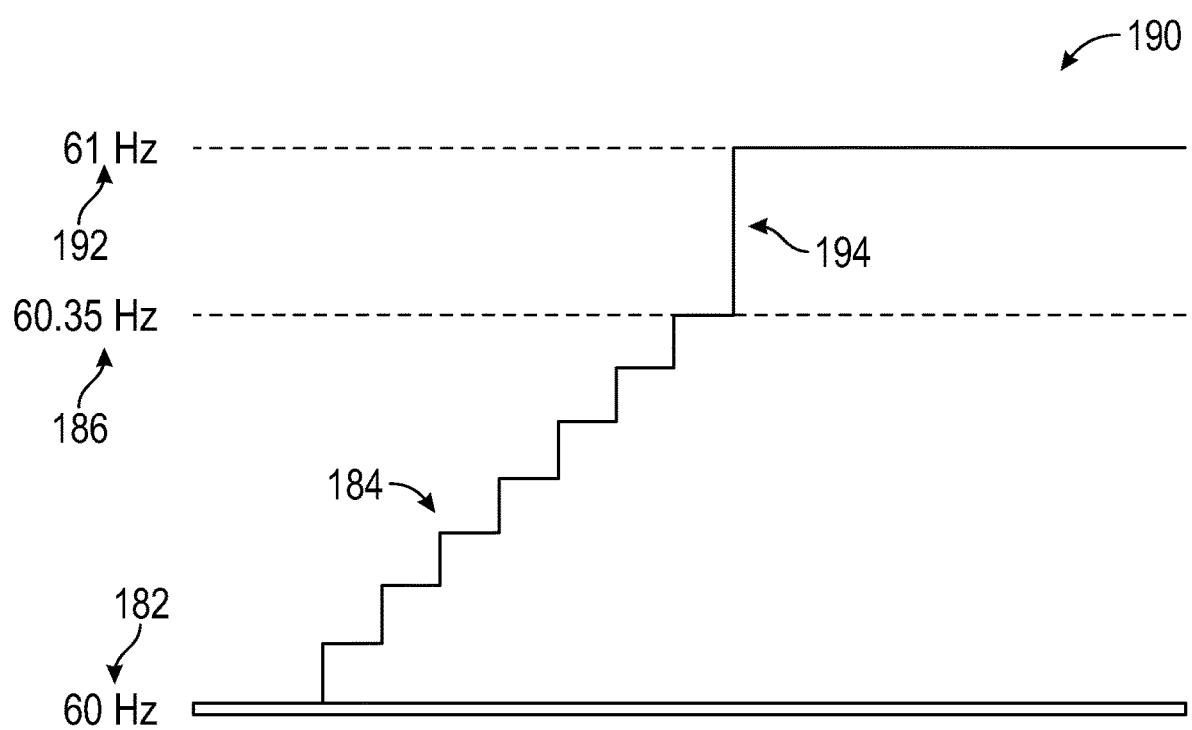
FIG. 5 depicts a graph of example operating frequencies of the inverter when the substation of the electric power delivery system is islanded in relation to method of FIG. 3, in accordance with an embodiment.

It should be appreciated that the described process blocks are by the way of example, and in different embodiments, different process blocks may be used. Moreover, it should also be appreciated that in different cases, some of the process blocks may be omitted or additional process blocks may be included. Moreover, FIGS. 4 and 5 depict example frequency ramp diagrams 180 and 190. The frequency ramp diagrams 180 and 190 are described below with respect to some of the process blocks of the method 160 of FIG. 3, as will be appreciated.

At block 162, the controller 144 may measure a power flow through the PCC breaker 124. The controller 144 may measure a power flow through the relay of the PCC breaker 124. At block 164, the controller 144 may determine whether the measured power flow is below a threshold. The threshold may be associated with a power flow when the BES 102 is providing a low electric power (e.g., the downstream electric current). For example, the threshold may be associated with a power flow when the BES 102 is idle, off, or otherwise providing a zero, close to zero, or low electric power. Moreover, the threshold may be different in different embodiments.

At block 166, when the measured power flow is not below the threshold, the controller 144 may cause the PCC breaker 124 to remain closed (e.g., connected). The controller 144 may cause the PCC breaker 124 to remain closed based on determining that the BES 102 is providing the electric power. That is, the controller 144 may determine that the BES 102 is providing the electric power based on the measured power flow through the relay of the PCC breaker 124 being equal to or above the threshold.

At block 168, the controller 144 may instruct increasing the operating frequency of the inverter 104 when the measured power flow is below the threshold. In some cases, increasing the operating frequency of the inverter 104 may increase the electric power flowing through the relay of the PCC breaker 124. For example, increasing the operating frequency of the inverter 104 may cause an increase in the electric power measured at the PCC breaker 124.

Moreover, in some embodiments, the controller 144 may instruct increasing the operating frequency of the inverter 104 based on a ramp rate. In FIGS. 4 and 5, an incremental frequency ramp 184 is depicted to illustrate increasing the operating frequency of the inverter 104 based on a ramp rate. In the depicted embodiment, the incremental frequency ramp 184 may incrementally increase from an initial frequency 182 of 60 Hz to an intermediary frequency 186 of 60.35 Hz.

However, it should be appreciated that the frequency values illustrated in FIGS. 4 and 5 are provided as an example and are not limiting. Accordingly, in other embodiments, the initial frequency 182 and the intermediary frequency 186 may include other frequency values. In any case, increasing the operating frequency of the inverter 104 based on the incremental frequency ramp 184 may reduce disturbance of the downstream components such as the loads 106, 108, 110, 112, and 114 and the fault current detectors 134, 136, 138, 140, and 142.

At block 170, the controller 144 may measure the power flow through the PCC breaker 124. For example, the controller 144 may measure the power flow through the relay of the PCC breaker 124 when the operating frequency is increased to the intermediary frequency 186. In some cases, the intermediary frequency 186 may be predetermined or preset. At block 172, the controller 144 may determine whether the measured power flow is below the threshold. That is, the controller 144 may determine whether the power flow through the relay of the PCC breaker 124 is above the threshold based on increasing the operating frequency of the inverter 104.

When the power flow is below the threshold, the controller 144 may determine that the BES 102 is the source of the electric power. Accordingly, at block 174, the controller 144 may instruct decreasing the operating frequency of the inverter 104 when the measured power flow is below the threshold. For example, the controller 144 may instruct decreasing the operating frequency of the inverter 104 to the initial frequency 182.

In some embodiments, the controller 144 may instruct decreasing the operating frequency of the inverter 104 based on a frequency ramp 188. In FIG. 4, the frequency ramp 188 is depicted to illustrate decreasing the operating frequency of the inverter 104 based on a ramp rate. Moreover, decreasing the operating frequency of the inverter 104 based on the frequency ramp 188 may reduce disturbance of the downstream components such as the loads 106, 108, 110, 112, and 114 and the fault current detectors 134, 136, 138, 140, and 142.

Alternatively, when the power flow is equal to or above the threshold, at block 176, the controller 144 may instruct increasing the operating frequency of the inverter to an inverter nominal operating frequency. As described above, in some cases, the fault current detectors 134, 136, 138, 140, and/or 142 of FIG. 1 may use inverter based frequency thresholds for load shedding based on the inverter nominal operating frequency. For example, the inverter nominal operating frequency may be higher than a high BES frequency threshold, as will be appreciated.

In FIG. 5, an increased frequency 194 may illustrate transitioning from the intermediary frequency 186 to an inverter nominal operating frequency 192. In the depicted embodiment, the inverter nominal operating frequency 192 is 61 Hz. However, in other embodiments, the inverter nominal operating frequency 192 may be different. For example, the downstream fault current detectors 134, 136, 138, 140, and/or 142 of FIG. 1 may determine when the electric power is provided by the inverter 104 based on detecting the inverter nominal operating frequency 192 that is equal to or above a high BES frequency threshold.

Moreover, at block 178, the controller 144 may instruct the PCC breaker to open based on determining that the inverter is providing the electric power. Accordingly, the substation 116, the downstream fault current detectors 134, 136, 138, 140, and 142, and the loads 106, 108, 110, 112, and 114 may become islanded based opening the PCC breaker 124.

Figure 6:
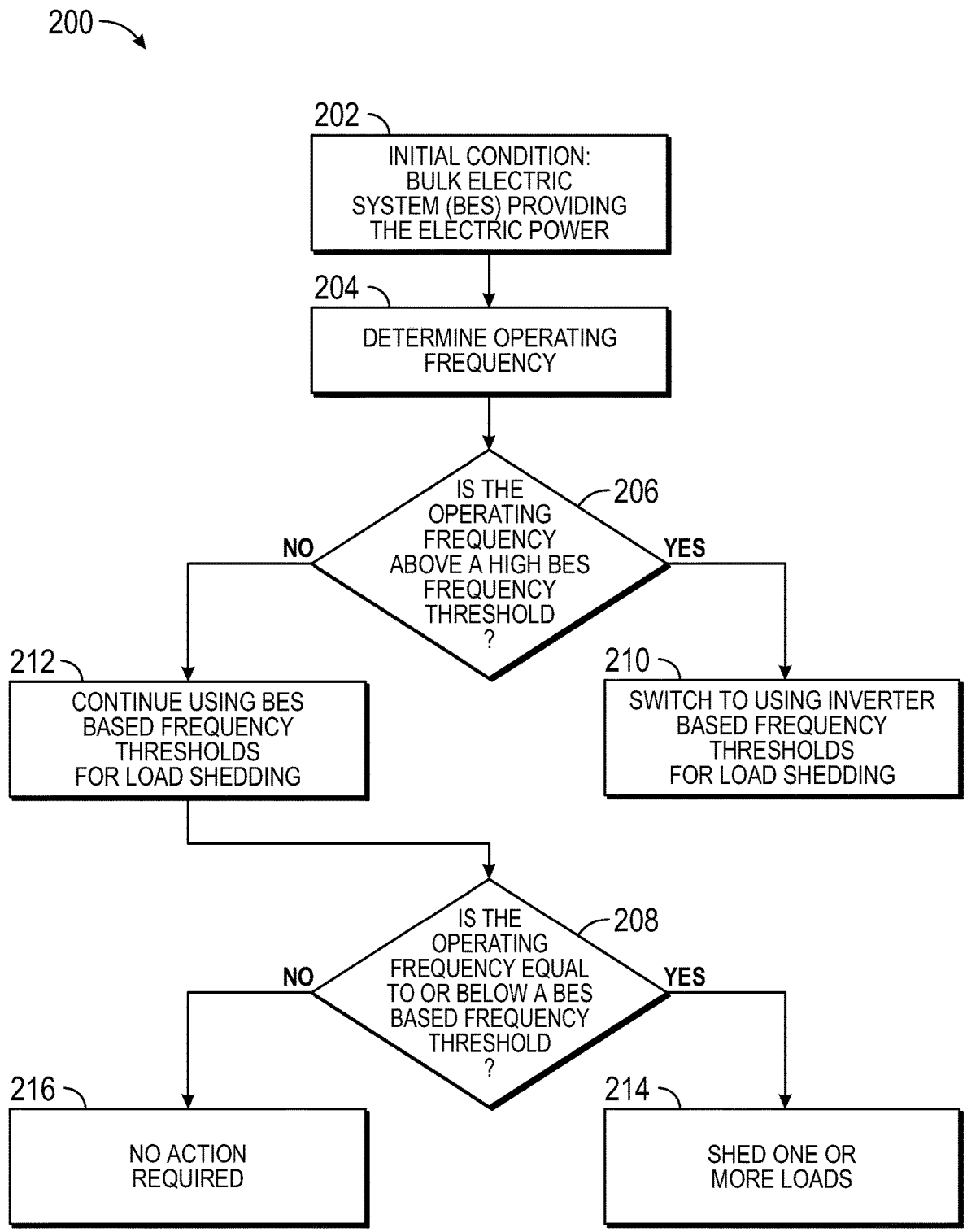
FIG. 6 depicts method of operating a fault current detector in the electric power delivery system of FIG. 1 when the bulk electric system is providing the electric power to the loads, in accordance with an embodiment.

Referring now to FIG. 6, a method 200 of operating a fault current detector, such as the fault current detectors 134, 136, 138, 140, and/or 142 of FIG. 1 is depicted. The method 200 starts at block 202 where a BES (e.g., the BES 102) is providing the electric power. In one example, the BES may provide the downstream electric current based on a 60 Hz nominal operating frequency. At block 204, the fault current detector may determine the operating frequency. As discussed above, the fault current detector may be disposed on, attached to, or otherwise electrically connected to a feeder or distribution line to determine the operating frequency. Moreover, in alternative embodiments, the fault current detector may monitor the operating frequency continuously or based on an interval time.

In any case, the fault current detector may compare the determined operating frequency with a high (e.g., maximum) BES frequency threshold (or traditional frequency threshold) at block 206 and with a BES frequency droop threshold at block 208. In different embodiments, the fault current detector may perform the operations of the blocks 206 and 208 consecutively, simultaneously, or in any suitable order. That is, although the blocks of the method 200 is depicted and described in a particular order, it should be appreciated that in different embodiments, the operations of the blocks may be performed in any viable order.

Referring back to block 206, when the operating frequency is above the high BES frequency threshold, the fault current detector may proceed to block 210. In one example, when the nominal frequency of the electric power is 60 Hz, the high BES frequency threshold may be 60.3 Hz. In some embodiments, the BES may not operate at a higher frequency than the high BES frequency threshold. Accordingly, detecting a operating frequency higher than the high BES frequency threshold indicates a switch to a different electric power source (e.g., the inverter).

At block 210, the fault current detector may switch to using inverter frequency droop thresholds for load shedding. In additional or alternative embodiments, the fault current detector may use other inputs and/or indications before switching to using the inverter frequency droop thresholds for load shedding at block 210. Moreover, in some cases, subsequent to switching to use the inverter-generation frequency thresholds for load shedding at block 210, the fault current detector may operate according to operations of the method 300 described below with respect to FIG. 4.

Referring back to block 208, when the operating frequency is equal to or below a BES frequency droop threshold, the fault current detector sheds one or more loads (e.g., the loads 106, 108, 110, 112, and/or 114 of FIG. 1) at block 214. In different embodiments, the fault current detector may shed different number of loads. Moreover, in specific embodiments, the fault current detector may use multiple BES frequency droop thresholds to shed different number of loads. For example, the fault current detector may compare the operating frequency to the multiple BES frequency droop thresholds to shed a respective number of loads.

In any case, when the operating frequency is above the BES frequency droop threshold, the fault current detector may perform no actions at block 216. That is, the fault current detector may not shed loads at block 216. In one example embodiment, subsequent to operations of blocks 214 and 216, the fault current detector may repeat the process of method 200 by starting over at block 202.

Figure 7:
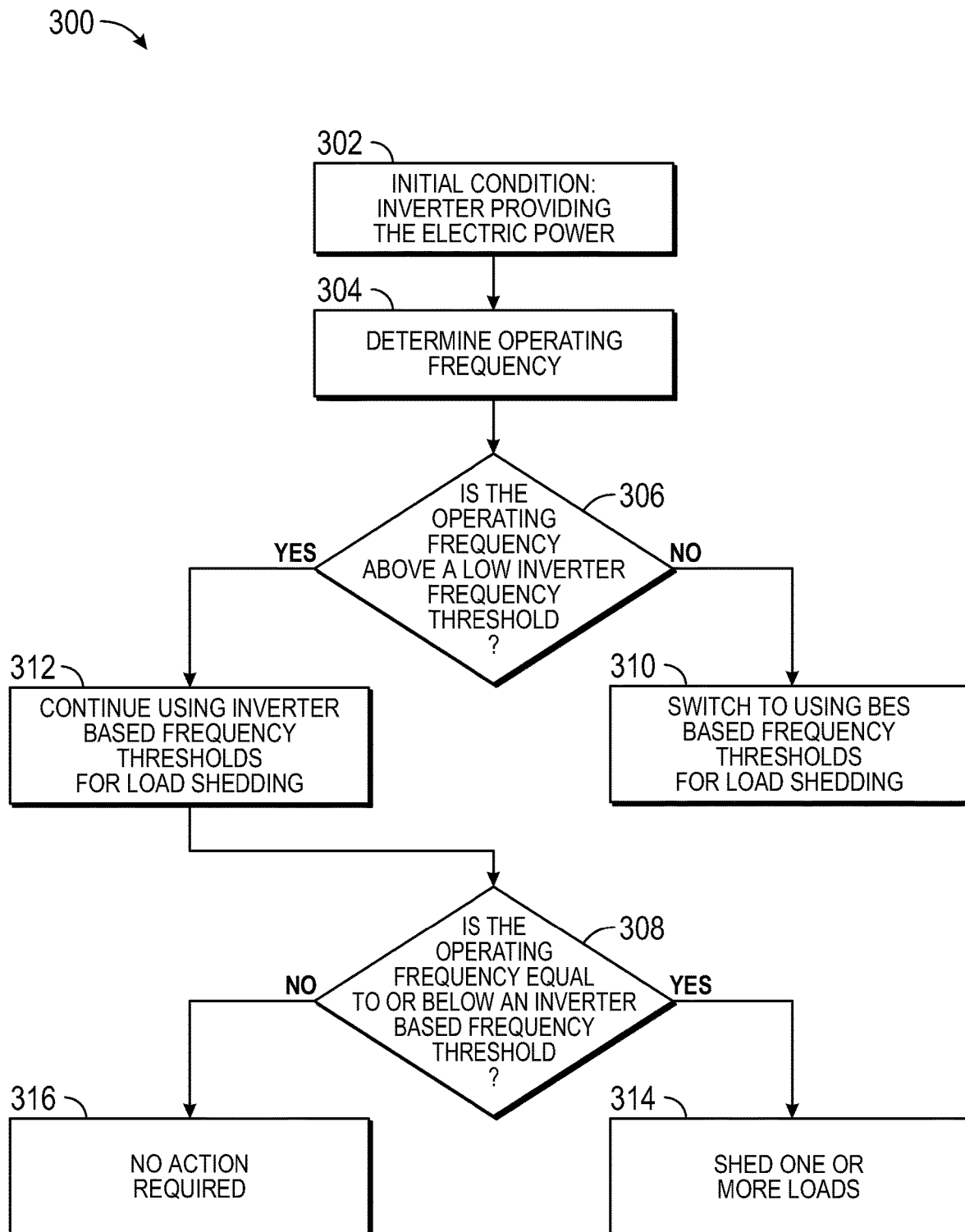
FIG. 7 depicts method of operating a fault current detector in the electric power delivery system of FIG. 1 when the inverter is providing the electric power to the loads, in accordance with an embodiment.

Referring now to FIG. 7, a method 300 for operating a fault current detector, such as the fault current detectors 134, 136, 138, 140, and/or 142, is depicted. The method 300 starts at block 302 where an inverter (e.g., the inverter 104) is providing the electric power. In one example, the inverter may provide the downstream electric power based on a 61 Hz nominal frequency. That is, the inverter may use a different nominal operating frequency for providing the downstream electric power that is higher than the operating frequency of the downstream electric power provided by the BES. In some embodiment, the inverter may provide the downstream electric power using a higher nominal operating frequency than the BES by more than a margin sufficient for implementing the inverter frequency droop thresholds.

In any case, at block 304, the fault current detector may determine the operating frequency. The fault current detector may monitor the operating frequency continuously or based on an interval time. At block 306, the fault current detector may compare the determined operating frequency with a low (e.g., minimum) inverter frequency threshold. Moreover, at block 308 the fault current detector may compare the determined operating frequency with an inverter-generation frequency threshold. That said, in different embodiments, the fault current detector may perform the operations of the blocks 306 and 308 subsequently, simultaneously, or in any suitable order.

At block 306, when the operating frequency is below (or equal to) the low inverter frequency threshold, the fault current detector may proceed to block 310. In one example, when the nominal operating frequency of the electric power is 61 Hz, the low inverter frequency threshold may be 60.21 Hz. In some embodiments, the inverter may not operate at a lower frequency than the low inverter frequency threshold (e.g., minimum inverter frequency threshold). Accordingly, detecting an operating frequency lower than the low inverter frequency threshold indicates a switch to a different electric power source (e.g., the BES).

At block 310, the fault current detector may switch to using BES-generation frequency thresholds for load shedding. In some embodiments, subsequent to switching to use the BES-generation frequency thresholds for load shedding at block 310, the fault current detector may operate according to operations of the method 200 described above with respect to FIG. 6. However, at block 306, when the operating frequency is above the low inverter frequency threshold, the fault current detector may continue using the inverter frequency droop thresholds for load shedding at block 312.

Referring back to block 308, when the operating frequency is equal to or below an inverter frequency droop threshold, the fault current detector sheds one or more loads at block 314. In different embodiments, the fault current detector may shed different number of loads. Moreover, in specific embodiments, the fault current detector may use multiple inverter frequency droop thresholds to shed different number of loads. For example, the fault current detector may compare the operating frequency to the multiple inverter-generation frequency thresholds to shed a respective number of loads.

In any case, when the operating frequency is above the inverter-generation frequency threshold, the fault current detector may perform no actions at block 316. That is, the fault current detector may not shed loads at block 316 when the operating frequency is above the inverter frequency threshold. In one example embodiment, subsequent to operations of blocks 314 and 316, the fault current detector may repeat the process of method 300 by starting over at block 302.

While frequency thresholds for shedding loads at block 208 and 308 are used here as examples, any suitable different sets of protection operations may be performed upon determining that the BES is connected to or disconnected from the microgrid based on the operating frequency being below or above the high BES threshold (i.e., from blocks 206, 306, and/or 154). Conversely, a second set of protection operations, such as more sensitive (e.g., more precise) overcurrent protection operations, may be performed upon determining that the BES is disconnected indicating that the inverter and the battery energy storage system are powering the loads.

That is, the fault current detector may perform a first set of protection operations associated with the relatively higher inertia of the BES when the PCC breaker (e.g., PCC breaker 124) connects the microgrid to the BES in the first mode. Moreover, the fault current detector may perform a second set of protection operations associated with the relatively lower inertia associated with the inverter and the battery energy storage system when the PCC breaker (e.g., PCC breaker 124) disconnects the microgrid from the BES in the second mode. For example, upon determining that the microgrid is islanded, the fault current detector may enable voltage controlled definite time over-current elements to improve stability of the islanded microgrid and may disable utility protective operations (e.g., 51 element operations). Conversely, upon determining that the PCC breaker is closed and the microgrid is connected to the BES, the fault current detector may disable voltage controlled definite time over-current elements and enable utility protective operations.

Figure 8:
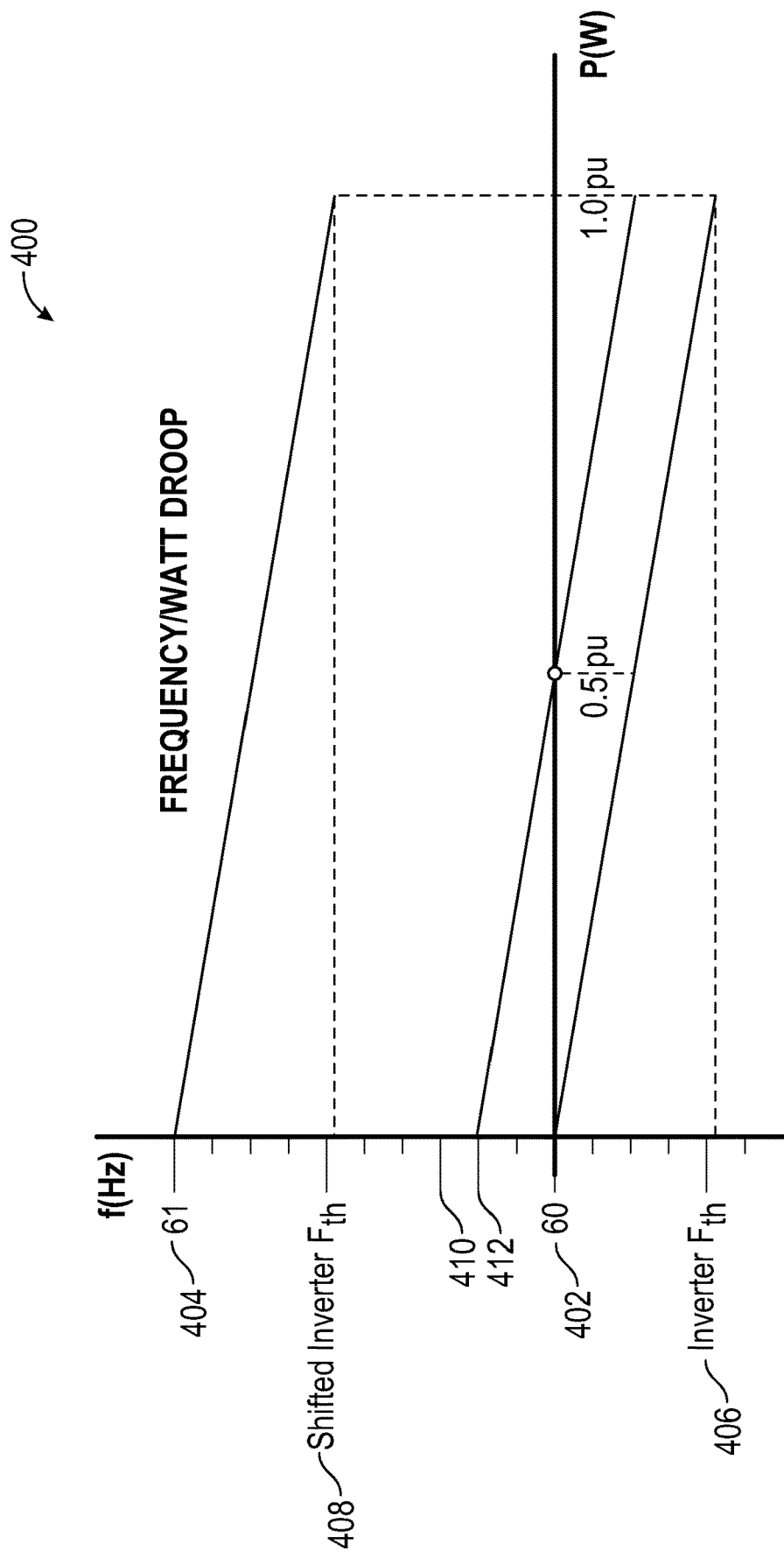
FIG. 8 depicts a graph of example frequency settings for operating one or more fault current detectors of the electric power delivery system of FIG. 1 in relation to methods of FIGS. 2 and 6, in accordance with an embodiment.

Referring now to FIG. 8, a graph 400 depicts an example frequency setting for operating one or more inverters (e.g., battery inverters) associated with the electric power delivery system 100. Moreover, a fault current detector (e.g., the fault current detectors 134, 136, 138, 140, and/or 142) may include or use a memory device, one or more processing circuitry, logic circuitry, and/or any other viable circuitry for including and using the depicted frequency settings. For example, the fault current detector may use non-transitory computer readable media to store the frequency settings of graph 400.

With that in mind, the graph 400 depicts an example relationship between operating frequency and power droop when using an inverter (e.g., the inverter 104 of FIG. 1) to provide electric power to downstream loads. The operating frequency droop of the electric power corresponds to a drop in supplied power caused by overloading the inverter. As such, the graph 400 depicts operating frequency droop of an inverter nominal operating frequency (e.g., 60 Hz) and a shifted inverter nominal operating frequency (e.g., 61 Hz) compared to electric power droop per power unit (pu). As discussed above, in some embodiments, the electric power delivery system 100 may use the shifted inverter nominal operating frequency when the BES 102 is no longer connected. That is, when the BES 102 is no longer connected, the inverter 104 may provide the electric power using the shifted inverter nominal operating frequency and the fault current detectors 134, 136, 138, 140, and 142 may use different settings for load shedding, as mentioned above and discussed below.

Referring now to the depicted embodiment, in some embodiments, the inverter may provide the electric power using an inverter nominal operating frequency 402 of 60 Hz. In some cases, the inverter may shift up the operating frequency to a shifted operating frequency 412 to compensate for a power drop (e.g., half unit power drop) by increasing the operating frequency. That said, the shifted operating frequency 412 may use a lower operating frequency than a switching frequency threshold 410 discussed below.

In alternative or additional embodiments, the inverter may provide the electric power using shifted inverter nominal operating frequency 404 of 61 Hz. In the depicted embodiment, a high (e.g., maximum) frequency droop of 0.7% Hertz per power unit (Hz/pu) may govern an inverter frequency droop threshold (inverter $F_{th}$) 406 and a shifted inverter frequency droop threshold (shifted inverter $F_{th}$) 408. That said, in alternative or additional embodiments, other frequency droop thresholds (e.g., 0.6% or 0.8% Hertz per power unit (Hz/pu)) may be used. As discussed above, a controller associated with the inverter (e.g., the controller 144 or the inverter controller described above) may shift the nominal operating frequency above a marginal threshold when switching from a BES power supply to the inverter. In the depicted embodiment, the marginal threshold may be shown by the switching frequency threshold 410, as will be appreciated.

When the inverter is providing the electric power using the inverter nominal operating frequency 402, the fault current detectors may open one or more breakers (e.g., load shedding) when the operating frequency approaches the inverter $F_{th}$ 406. Moreover, when the inverter is providing the electric power using the shifted inverter nominal operating frequency 404, the fault current detectors may open one or more breakers (e.g., load shedding) when the operating frequency approaches the shifted inverter $F_{th}$ 408. In some cases, the inverter may provide the electric power using the shifted inverter nominal operating frequency 404 when the electric power delivery system includes a BES providing the electric power using the inverter nominal operating frequency 402.

For example, when the BES is providing the electric power using the inverter nominal operating frequency 402, the fault current detectors may shed loads according to a first mode. Moreover, when the inverter is providing the electric power using the shifted inverter nominal operating frequency 404, the fault current detectors may shed loads according to a second mode. Accordingly, the fault current detectors may operate according to different frequency settings when determining a switched operational state based on the switching frequency threshold (e.g., the inverter $F_{th}$ 406 and the shifted inverter $F_{th}$ 408 in the different modes).

For example, a fault current detector, at block 308 of the method 300, may determine whether the operating frequency is equal to or below the inverter $F_{th}$ 406 or the shifted inverter $F_{th}$ 408. The fault current detector may operate in a first operational mode or a second operational mode based on the nominal operating frequency of the downstream power. For example, the fault current detector may compare the inverter nominal operating frequency with the switching frequency threshold 410 to determine using the inverter $F_{th}$ 406 or the shifted inverter $F_{th}$ 408 for load shedding.

In the depicted embodiment, the shifted inverter $F_{th}$ 408 may equal a frequency droop threshold number within a range of 60 Hz and 61 Hz. In one example, the inverter $F_{th}$ 406 may equal 60.58 Hz. As such, a fault current detector, at block 208 of the method 200, may determine whether the operating frequency is equal to or below the shifted inverter $F_{th}$ 408 (e.g., 60.58 Hz). However, it should be appreciated that in different embodiments, other range of frequencies may be used for the inverter $F_{th}$ 406 and the shifted inverter $F_{th}$ 408. For example, the inverter $F_{th}$ 406 and the shifted inverter $F_{th}$ 408 may each be a percentage (e.g., 0.7%) lower than an operating frequency of the BES 102 and the inverter 104, respectively.

As mentioned above, the inverter may provide the downstream electric power using the shifted inverter nominal operating frequency 404 that is using a higher frequency than the BES operating frequency by more than a marginal threshold. For example, the BES operating frequency may be equal to or close to the inverter nominal operating frequency 402. As such, the fault current detectors may determine the electric power source by determining the nominal operating frequency of the downstream power. Accordingly, based on the electric power source, the fault current detectors may use different measurement techniques, such as using higher precision measurements for load shedding with inverter power supplies, to coordinate load shedding and peak shaving functionality of the electric power delivery system 100.

In some embodiments, the switching frequency threshold 410 may be within a range of 60 Hz and 61 Hz (e.g., 60.3 Hz). Moreover, in some embodiments, the switching frequency threshold 410 may comprise a high switching frequency threshold for switching to the inverter and a low frequency threshold for switching to the BES. That is, the fault current detector may determine a switch of the electric power source from the BES to the inverter when the operating frequency of the electric power is higher than a high operating frequency threshold associated with the BES (e.g., 60.3 Hz). Moreover, the fault current detector may determine a switch of the electric power source from the inverter to the BES when the operating frequency is lower than a low current frequency threshold associated with the inverter (e.g., 60.23 Hz).

In any case, the switching frequency threshold 410 may be selected based on a margin distance from the shifted inverter $F_{th}$ 408 and the inverter nominal operating frequency 402. Nevertheless, the graph 400 depicts one example of thresholds to be used with the electric power delivery system 100 including the BES 102 and the inverter 104 to provide the electric power. Moreover, it should be appreciated that other threshold may be used in different embodiments to provide sufficient margins between the depicted thresholds.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure. Moreover, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
   measuring, by a controller, a first power flow associated with a point of common coupling breaker;
   determining, by the controller, that the first power flow is below a threshold;
   providing, by the controller, instructions to increase an operating frequency of an inverter higher than an initial operating frequency in response to determining that the first power flow is below the threshold;
   measuring, by the controller, a second power flow associated with the point of common coupling breaker;
   determining, by the controller, that the second power flow is equal to or above the threshold based at least in part on increasing the operating frequency of the inverter; and
   providing, by the controller, instructions to open the point of common coupling breaker in response to determining that the second power flow is equal to or above the threshold based at least in part on increasing the operating frequency of the inverter.

2. The method of claim 1, comprising increasing, by the inverter, the operating frequency of the inverter based on an incremental ramp rate when the controller determines that the first power flow is below the threshold and in response to receiving the instructions to increase the operating frequency.

3. The method of claim 1, comprising providing, by the controller, instructions to increase the operating frequency of the inverter to an inverter nominal operating frequency in response to determining that the second power flow is equal to or above the threshold.

4. The method of claim 1, comprising providing, by the controller, instructions to decrease the operating frequency of the inverter in response to determining that the first power flow is equal to or above the threshold.

5. The method of claim 4, comprising decreasing, by the inverter, the operating frequency of the inverter based on a ramp rate in response to receiving the instructions to decrease the operating frequency.

6. The method of claim 1, wherein measuring the second power flow associated with the point of common coupling breaker is in response to determining that the operating frequency is increased to an intermediary frequency higher than the initial operating frequency.

7. The method of claim 1, wherein the controller, the point of common coupling breaker, and the inverter are associated with a substation.

8. The method of claim 1, wherein the point of common coupling breaker and the inverter are associated with a substation, and wherein the controller is associated with a fault current detector positioned downstream from the substation.

9. A fault current detector configured to:
   measure a first power flow associated with a point of common coupling breaker;
   determine that the first power flow is below a threshold;
   provide instructions to increase an operating frequency of an inverter higher than an initial operating frequency in response to determining that the first power flow is below the threshold;
   measure a second power flow associated with the point of common coupling breaker;
   determine that the second power flow is equal to or above the threshold based at least in part on increasing the operating frequency of the inverter; and
   provide instructions to open the point of common coupling breaker in response to determining that the second power flow is equal to or above the threshold based at least in part on increasing the operating frequency of the inverter.

10. The fault current detector of claim 9, wherein the fault current detector is configured to provide instructions to increase the operating frequency of the inverter to an inverter nominal operating frequency in response to determining that the second power flow is equal to or above the threshold.

11. The fault current detector of claim 9, wherein the fault current detector is configured provide instructions to decrease the operating frequency of the inverter in response to determining that the first power flow is equal to or above the threshold.

12. The fault current detector of claim 9, wherein measuring the second power flow associated with the point of common coupling breaker is in response to determining that the operating frequency is increased to an intermediary frequency higher than the initial operating frequency.

13. A non-transitory computer-readable medium comprising instructions, wherein the instructions, when executed by processing circuitry, are configured to cause the processing circuitry to perform operations comprising:

measuring, by a controller, a first power flow associated with a point of common coupling breaker;

determining, by the controller, that the first power flow is below a threshold;

providing, by the controller, instructions to increase an operating frequency of an inverter higher than an initial operating frequency in response to determining that the first power flow is below the threshold;

measuring, by the controller, a second power flow associated with the point of common coupling breaker;

determining, by the controller, that the second power flow is equal to or above the threshold based at least in part on increasing the operating frequency of the inverter; and providing, by the controller, instructions to open the point of common coupling breaker in response to determining that the second power flow is equal to or above the threshold based at least in part on increasing the operating frequency of the inverter.

14. The non-transitory computer-readable medium of claim 13, wherein opening the point of common coupling sheds an electrical load.

15. The non-transitory computer-readable medium of claim 13, wherein the operations further comprise:

increasing, by the inverter, the operating frequency of the inverter based on an incremental ramp rate when the controller determines that the first power flow is below the threshold and in response to receiving the instructions to increase the operating frequency.

16. The non-transitory computer-readable medium of claim 13, wherein the operations further comprise:

providing instructions to increase the operating frequency of the inverter to an inverter nominal operating frequency in response to determining that the second power flow is equal to or above the threshold.

17. The non-transitory computer-readable medium of claim 13, wherein the operations further comprise:

providing instructions to decrease the operating frequency of the inverter in response to determining that the first power flow is equal to or above the threshold.

18. The non-transitory computer-readable medium of claim 13, wherein measuring the second power flow associated with the point of common coupling breaker is in response to determining that the operating frequency is increased to an intermediary frequency higher than the initial operating frequency.

* * * * *